United States Patent
Takahashi et al.

(10) Patent No.: US 10,098,516 B2
(45) Date of Patent: Oct. 16, 2018

(54) METHOD FOR PRODUCING CLEANING MEMBER, AND SYSTEM FOR PRODUCING CLEANING MEMBER

(71) Applicant: UNICHARM CORPORATION, Shikokuchuo-shi, Ehime (JP)

(72) Inventors: Shigetomo Takahashi, Kanonji (JP); Hiroaki Goto, Kanonji (JP); Takayuki Matsumoto, Kanonji (JP); Yuji Yamashita, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 477 days.

(21) Appl. No.: 14/655,971

(22) PCT Filed: Dec. 27, 2013

(86) PCT No.: PCT/JP2013/085177
§ 371 (c)(1),
(2) Date: Jun. 26, 2015

(87) PCT Pub. No.: WO2014/104325
PCT Pub. Date: Jul. 3, 2014

(65) Prior Publication Data
US 2015/0351600 A1    Dec. 10, 2015

(30) Foreign Application Priority Data

Dec. 29, 2012 (JP) .................................. 2012-289189

(51) Int. Cl.
*A47L 13/16* (2006.01)
*A47L 13/38* (2006.01)
(Continued)

(52) U.S. Cl.
CPC ............... *A47L 13/16* (2013.01); *A47L 13/38* (2013.01); *B29C 65/18* (2013.01); *B32B 5/26* (2013.01);
(Continued)

(58) Field of Classification Search
CPC .......... A47L 13/10; A47L 13/16; A47L 13/38; B29C 65/18; B29C 65/20; B65H 57/02;
(Continued)

(56) References Cited

U.S. PATENT DOCUMENTS 345,644 A   7/1886  Moseman
470,898 A   3/1892  Reiffel
(Continued)

FOREIGN PATENT DOCUMENTS

EP   0546580   6/1993
EP   2009152   12/2008
(Continued)

OTHER PUBLICATIONS

Office Action dated Apr. 29, 2015, corresponding to U.S. Appl. No. 13/749,717
(Continued)

*Primary Examiner* — Michael A Tolin
(74) *Attorney, Agent, or Firm* — Hauptman Ham, LLP

(57) ABSTRACT

A method of continuously producing a cleaning member obtained from a multilayer web that includes at least a fiber bundle and a non-woven fabric, includes the following steps: preparing a guide member provided with a pair of width-adjusting members having a predetermined interval therebetween; conveying a fiber bundle through the pair of width-adjusting members of the guide member to adjust the width of the fiber bundle strip so as to match the aforementioned interval; forming the multilayer web by overlaying the fiber bundle, the width of which has been adjusted, on
(Continued)

the non-woven fabric; and joining the fiber bundle and non-woven fabric.

8 Claims, 5 Drawing Sheets

(51) Int. Cl.
| | |
|---|---|
| B29C 65/18 | (2006.01) |
| B65H 57/02 | (2006.01) |
| B32B 5/26 | (2006.01) |
| D01D 11/02 | (2006.01) |
| D02J 1/18 | (2006.01) |
| B32B 37/00 | (2006.01) |
| B65H 57/26 | (2006.01) |
| D01D 10/04 | (2006.01) |

(52) U.S. Cl.
CPC ......... *B32B 37/0076* (2013.01); *B65H 57/02* (2013.01); *B65H 57/26* (2013.01); *D01D 10/0436* (2013.01); *D01D 11/02* (2013.01); *D02J 1/18* (2013.01)

(58) Field of Classification Search
CPC ....... B65H 57/26; B32B 5/26; B32B 37/0076; D01D 10/04; D01D 10/0436; D01D 11/02; D02J 1/18
See application file for complete search history.

(56) References Cited

U.S. PATENT DOCUMENTS

| | | | |
|---|---|---|---|
| 1,847,065 A | 2/1932 | Munch | |
| 1,989,048 A | 1/1935 | Winter et al. | |
| 2,733,064 A | 1/1956 | Martin | |
| 2,737,688 A | 3/1956 | Jackson | |
| 2,738,973 A | 3/1956 | Koch | |
| 2,748,426 A * | 6/1956 | Wyatt | D01G 1/081 19/0.37 |
| 2,828,752 A | 4/1958 | Jackson | |
| 2,836,418 A | 5/1958 | Blattner et al. | |
| 2,904,335 A | 9/1959 | Rabinow | |
| 2,926,392 A | 3/1960 | Jackson | |
| 2,960,023 A | 11/1960 | Greiner et al. | |
| 3,017,309 A | 1/1962 | Crawford | |
| 3,022,999 A | 2/1962 | Mead | |
| 3,095,343 A | 6/1963 | Berger | |
| 3,120,692 A * | 2/1964 | Crawford | A24D 3/0204 264/168 |
| 3,218,675 A * | 11/1965 | Hendrix | D02G 1/12 28/262 |
| 3,362,707 A | 1/1968 | Lauren | |
| 3,370,848 A | 2/1968 | Bartlett | |
| 3,376,609 A | 4/1968 | Kalwaites | |
| 3,417,560 A | 12/1968 | Watson | |
| 3,468,096 A * | 9/1969 | Franz | A47L 17/08 15/104.93 |
| 3,469,285 A * | 9/1969 | Garrison | D01G 1/083 19/0.37 |
| 3,566,451 A | 3/1971 | Welgand | |
| 3,592,371 A | 7/1971 | Wyatt et al. | |
| 3,608,024 A | 9/1971 | Yazawa et al. | |
| 3,724,037 A | 4/1973 | Nicholson et al. | |
| 3,737,950 A | 6/1973 | Bolliand et al. | |
| 3,827,113 A | 8/1974 | Vidal et al. | |
| 3,840,941 A | 10/1974 | Neveu | |
| 3,860,127 A | 1/1975 | Fassman | |
| 3,907,128 A | 9/1975 | Cathers | |
| 3,912,258 A | 10/1975 | Martin | |
| 3,996,196 A | 6/1976 | Simeth | |
| 4,075,375 A | 2/1978 | Komatsu | |
| 4,190,241 A | 2/1980 | Krueger | |
| 4,319,744 A | 3/1982 | Nagel et al. | |
| 4,385,757 A | 5/1983 | Muller | |
| 4,514,128 A | 4/1985 | Hedrick | |
| 4,640,161 A | 2/1987 | Kurk | |
| 4,664,368 A | 5/1987 | Bouwens et al. | |
| 4,817,483 A | 4/1989 | Armbruster | |
| 4,961,805 A | 10/1990 | Siebert | |
| 5,060,351 A | 10/1991 | Street | |
| 5,060,929 A | 10/1991 | Kohlmann | |
| 5,168,786 A | 12/1992 | Huggins et al. | |
| 5,230,764 A | 7/1993 | Moll | |
| 5,241,731 A | 9/1993 | Stuart | |
| 5,243,890 A | 9/1993 | Ober | |
| 5,253,762 A | 10/1993 | Duncan | |
| 5,332,210 A | 7/1994 | Silverberg et al. | |
| 5,355,567 A | 10/1994 | Holliday | |
| 5,417,912 A | 5/1995 | Merry | |
| 5,431,530 A | 7/1995 | Kobayashi et al. | |
| 5,435,541 A | 7/1995 | Fornay et al. | |
| 5,516,091 A | 5/1996 | Nakayama | |
| 5,535,576 A | 7/1996 | Walintschek | |
| 5,779,432 A | 7/1998 | Pena | |
| 6,286,403 B1 | 9/2001 | Rosenthal et al. | |
| 6,491,492 B1 | 12/2002 | Cook | |
| 6,494,450 B2 | 12/2002 | Tsurumaki | |
| 6,554,937 B1 | 4/2003 | Kenmochi et al. | |
| 6,572,101 B2 | 6/2003 | Kaya et al. | |
| 6,585,842 B1 | 7/2003 | Bompard et al. | |
| 6,743,392 B2 | 6/2004 | Tanaka et al. | |
| 6,780,264 B2 | 8/2004 | Nakata et al. | |
| 7,003,856 B2 * | 2/2006 | Hayashi | D02J 1/18 28/282 |
| 7,156,011 B2 | 1/2007 | Morris et al. | |
| 7,228,587 B2 | 6/2007 | Tanaka et al. | |
| 7,300,053 B2 | 11/2007 | Asano | |
| 7,339,675 B2 | 3/2008 | Nishida et al. | |
| 7,536,761 B2 | 5/2009 | Nestler et al. | |
| 7,571,524 B2 | 8/2009 | Kawabe et al. | |
| 8,100,038 B2 | 1/2012 | Sandahl | |
| 8,201,429 B1 | 6/2012 | Matsunaga | |
| 8,357,415 B2 | 1/2013 | Furusawa | |
| 8,448,335 B2 | 5/2013 | Lundgren et al. | |
| 2002/0026699 A1 | 3/2002 | Hayashi et al. | |
| 2002/0148061 A1 | 10/2002 | Tanaka et al. | |
| 2003/0000934 A1 | 1/2003 | Tanaka et al. | |
| 2003/0127177 A1 | 7/2003 | Lane | |
| 2003/0172506 A1 | 9/2003 | Guirman et al. | |
| 2004/0149095 A1 | 8/2004 | Miyatake et al. | |
| 2005/0005381 A1 | 1/2005 | Tanaka et al. | |
| 2005/0039285 A1 | 2/2005 | Tanaka et al. | |
| 2005/0066496 A1 | 3/2005 | Ames et al. | |
| 2005/0097695 A1 | 5/2005 | Tanaka et al. | |
| 2005/0097696 A1 | 5/2005 | Tanaka et al. | |
| 2005/0102979 A1 | 5/2005 | Uezono et al. | |
| 2005/0132521 A1 | 6/2005 | Tanaka et al. | |
| 2005/0139513 A1 | 6/2005 | Miller | |
| 2005/0177967 A1 | 8/2005 | Tanaka et al. | |
| 2005/0188490 A1 | 9/2005 | Tanaka et al. | |
| 2005/0193514 A1 | 9/2005 | Tanaka et al. | |
| 2005/0198760 A1 | 9/2005 | Tanaka et al. | |
| 2005/0258589 A1 | 11/2005 | Michler et al. | |
| 2006/0005675 A1 | 1/2006 | Scheffer et al. | |
| 2006/0016035 A1 | 1/2006 | Tanaka et al. | |
| 2006/0016036 A1 | 1/2006 | Tanaka et al. | |
| 2006/0048325 A1 | 3/2006 | Tsuchiya | |
| 2006/0051434 A1 | 3/2006 | Tsuchiya | |
| 2006/0101601 A1 | 5/2006 | Fujiwara et al. | |
| 2006/0156876 A1 | 7/2006 | Sussmeier et al. | |
| 2006/0179989 A1 | 8/2006 | James et al. | |
| 2007/0068353 A1 | 3/2007 | Piucci et al. | |
| 2007/0101564 A1 | 5/2007 | Nestler et al. | |
| 2008/0047087 A1 | 2/2008 | Levy et al. | |
| 2009/0049633 A1 | 2/2009 | Takabayashi et al. | |
| 2009/0165230 A1 | 7/2009 | Tsuchiya et al. | |
| 2009/0169830 A1 | 7/2009 | Yamada | |
| 2009/0172904 A1 | 7/2009 | Tsuchiya et al. | |
| 2009/0196538 A1 | 8/2009 | Liou et al. | |
| 2009/0255078 A1 | 10/2009 | Wada et al. | |
| 2010/0000382 A1 | 1/2010 | Maddalon | |
| 2010/0015383 A1 | 1/2010 | Yamada | |
| 2010/0022978 A1 | 1/2010 | Kasai et al. | |

(56) References Cited

U.S. PATENT DOCUMENTS

| | | |
|---|---|---|
| 2010/0058907 A1 | 3/2010 | Kern |
| 2010/0122613 A1 | 5/2010 | Sandahl |
| 2010/0154156 A1 | 6/2010 | Takabayashi et al. |
| 2010/0180745 A1 | 7/2010 | Hall |
| 2011/0088189 A1 | 4/2011 | Wada et al. |
| 2011/0138942 A1 | 6/2011 | Murata |
| 2011/0296965 A1 | 12/2011 | Manek-Honninger et al. |
| 2012/0102678 A1 | 5/2012 | Junker et al. |
| 2012/0132046 A1 | 5/2012 | Supe-Dienes |
| 2012/0135227 A1 | 5/2012 | Kawabe |
| 2012/0167736 A1 | 7/2012 | Yokoe |
| 2013/0305891 A1 | 11/2013 | Nobukuni |
| 2014/0182429 A1 | 7/2014 | Saito et al. |
| 2014/0187406 A1 | 7/2014 | Matsumoto et al. |

FOREIGN PATENT DOCUMENTS

| | | |
|---|---|---|
| JP | 45-35382 | 11/1970 |
| JP | 48-89917 | 10/1973 |
| JP | 56-169873 | 12/1981 |
| JP | 61-105364 U | 7/1986 |
| JP | 61-105364 U | 7/1986 |
| JP | 3-33222 | 2/1991 |
| JP | 4-289100 A | 10/1992 |
| JP | 5-20896 U | 3/1993 |
| JP | 5-279950 | 10/1993 |
| JP | 5-316909 | 12/1993 |
| JP | 6-297386 A | 10/1994 |
| JP | 8-49126 | 2/1996 |
| JP | 9-111644 | 4/1997 |
| JP | 9-111644 A | 4/1997 |
| JP | 10-110346 | 4/1998 |
| JP | 10-266012 A | 10/1998 |
| JP | 11-323718 | 11/1999 |
| JP | 2000-296083 | 10/2000 |
| JP | 2001-246595 | 9/2001 |
| JP | 2001-288639 | 10/2001 |
| JP | 2002-66991 A | 3/2002 |
| JP | 2002-069781 | 3/2002 |
| JP | 2003-265390 | 9/2003 |
| JP | 2003-268663 | 9/2003 |
| JP | 2003-293236 | 10/2003 |
| JP | 2004-223692 | 8/2004 |
| JP | 2004-238615 | 8/2004 |
| JP | 2004-238615 A | 8/2004 |
| JP | 2005-040641 | 2/2005 |
| JP | 2005-046645 | 2/2005 |
| JP | 2005-111284 | 4/2005 |
| JP | 2005-137929 | 6/2005 |
| JP | 2005-137930 | 6/2005 |
| JP | 2005-137931 | 6/2005 |
| JP | 2005-144198 | 6/2005 |
| JP | 2005-169148 | 6/2005 |
| JP | 2005-237975 | 9/2005 |
| JP | 2006-015164 | 1/2006 |
| JP | 2006-034990 | 2/2006 |
| JP | 2006-141483 | 6/2006 |
| JP | 2006-152485 | 6/2006 |
| JP | 2006-166931 | 6/2006 |
| JP | 2006-265762 | 10/2006 |
| JP | 2007-002390 | 1/2007 |
| JP | 2007-029135 | 2/2007 |
| JP | 2007-111297 | 5/2007 |
| JP | 2007-126810 | 5/2007 |
| JP | 2007-135666 | 6/2007 |
| JP | 2007-135774 | 6/2007 |
| JP | 2007-136156 | 6/2007 |
| JP | 2007-159612 | 6/2007 |
| JP | 2007-209460 | 8/2007 |
| JP | 2007-283086 | 11/2007 |
| JP | 2008-6260 | 1/2008 |
| JP | 2008-119171 | 5/2008 |
| JP | 2008-125603 | 6/2008 |
| JP | 2008-125603 A | 6/2008 |
| JP | 2009-153914 | 7/2009 |
| JP | 2009-254536 A | 11/2009 |
| JP | 2010-24575 | 2/2010 |
| JP | 2011-062802 | 3/2011 |
| JP | 2011-84313 A | 4/2011 |
| JP | 2011-94701 A | 5/2011 |
| JP | 4738311 | 8/2011 |
| JP | 2013-240861 A | 12/2013 |
| KR | 20110137660 | 12/2011 |
| WO | 2007/023965 | 3/2007 |
| WO | 2008/099733 A1 | 8/2008 |

OTHER PUBLICATIONS

Office Action dated Apr. 27, 2015, corresponding to U.S. Appl. No. 13/749,726.

International Search Report dated Mar. 25, 2014, corresponds to International Application No. PCT/JP2013/085172.

International Search Report dated Mar. 18, 2014, corresponds to International Application No. PCT/JP2013/085177.

International Search Report dated Apr. 1, 2014, corresponds to International Application No. PCT/JP2013/085233.

International Search Report and Written Opinion dated Feb. 18, 2014, corresponds to International Application No. PCT/JP2013/085203.

International Search Report and Written Opinion dated Mar. 25, 2014, corresponds to International Application No. PCT/JP2013/085170.

International Search Report and Written Opinion dated Feb. 18, 2014, corresponds to Internation Application No. PCT/JP2013/085179.

Office Action issued in corresponding to U.S. Appl. No. 14/758,175, dated Aug. 9, 2018, 26 pages.

\* cited by examiner

METHOD FOR PRODUCING CLEANING MEMBER, AND SYSTEM FOR PRODUCING CLEANING MEMBER

RELATED APPLICATIONS

The present application is a National Phase of International Application Number PCT/JP2013/085177, filed Dec. 27, 2013, which claims priority to Japanese Application Number 2012-289189, filed Dec. 29, 2012.

TECHNICAL FIELD

The present invention relates to a method of producing a cleaning member, and a system of producing a cleaning member.

BACKGROUND ART

Various types of cleaning members capable of trapping dust, trash, etc., are conventionally known, and methods for producing the various types have been examined from a variety of viewpoints.

For example, Patent Document 1 proposes a method of producing a cleaning member comprising the steps of:

stacking a belt-shaped inner fibrous layer consisting of continuous fiber bundles and a sheet with slits member, both being partially joined to form a first continuous body, followed by the formation of a second continuous body in a similar manner, and, after the first and the second continuous bodies are stacked and partially fixed, stacking and fixing a belt-shaped outer fibrous layer consisting of continuous fiber bundles on each of the inner fibrous layer side of the first and the second continuous bodies;

cutting the laminate obtained in the preceding step into a predetermined length; and applying a compressed air to the fibrous layer part of the cut laminate to open the fiber bundles;

wherein the belt-shaped inner fibrous layer and outer fibrous layer are each composed of fiber bundles consisting of curled fibers bent in a zig-zag form, a vertical height between the alternating peaks and troughs of the curled fiber is 0.1 to 0.7 mm, and, during the step of opening the fiber bundles, the fiber bundles in the cut laminate are teased so that the entire periphery of the cleaning member is covered with brush tips consisting of the fiber of the fiber bundles.

Also, Patent Document 2, for example, proposes a method of producing a cleaning member, wherein a first continuous body having a first fibrous layer consisting of continuous fiber bundles and a first belt-shaped member, in which both longitudinal ends of the first belt-shaped member are folded to be stacked and fixed, and the first fibrous layer is stacked on and fixed to the outer face side of the first belt-shaped member, and a second continuous body having a second fibrous layer consisting of continuous fiber bundles and a second belt-shaped member, in which both longitudinal ends of the second belt-shaped member are folded to be stacked and fixed, and the second fibrous layer is stacked and fixed on the outer face side of the second belt-shaped member, are produced, and, after the first continuous body and the second continuous body thus produced are stacked and joined to each other, a third fibrous layer and a fourth fibrous layer, each consisting of continuous fibrous bundles, are stacked on the first fibrous layer and the second fibrous layer, respectively, and fixed to form a laminate, then the laminate thus formed is cut to obtain individual cleaning members, characterized in that the method comprises the steps of:

intermittently forming broken guide lines spanning the entire lateral area of each of the first belt-shaped member and the second belt-shaped member in the first belt-shaped member and the second belt-shaped member so that a central part sandwiched by a pair of broken guide lines and an external part provided consecutively in the central part via the broken guide lines are formed in each of the first belt-shaped member and the second belt-shaped member, respectively;

connecting the first belt-shaped member and the second belt-shaped member, after forming the broken guide lines, to the first fibrous layer and the second fibrous layer with a central continuous seal line spanning the entire lateral area of each of the first fibrous layer and the second fibrous layer to produce the first continuous body and the second continuous body;

stacking the first continuous body and the second continuous body to join them with side noncontinuous seals spanning the entire lateral area of the first fibrous layer and the second fibrous layer;

further stacking and fixing a third fibrous layer and a fourth fibrous layer on the first fibrous layer of the first continuous body and the second fibrous layer of the second continuous body to form the laminate;

excising the external part flanking the central part, leaving the central part sandwiched by the pair of broken guide lines, from each of the cut first belt-shaped member and the cut second belt-shaped member, after cutting the laminate; and opening the cut first through fourth fibrous layers, so as to tease them randomly in three-dimensional directions, after cutting the laminate.

Furthermore, Patent Document 3, for example, proposes a method of producing a cleaning member comprising the steps of:

laminating a continuous body comprising a four-layered long fibrous layer in which fiber bundles are oriented in one direction, a continuous body comprising two long scraping sheets, and a continuous body comprising two long base sheet in the order of the continuous body comprising the fibrous layer, the continuous body comprising the scraping sheets, the continuous body comprising the fibrous layer, the continuous body comprising the two base sheets, the continuous body comprising the fibrous layer, the continuous body comprising the scraping sheets, and the continuous body comprising the fibrous layer, joining the continuous bodies with one another at a predetermined distance in the lateral direction to prepare a cleaning member continuous body, and then cutting, in the lateral direction, the cleaning member continuous body at the junctions between the continuous body of the fibrous layer and the continuous body of the base sheet and the continuous body of the scraping sheet to obtain a plurality of the cleaning member.

CITATION LIST

Patent Literature

PTL 1 JP4,878,988B
PTL 2 JP4,738,311B
PTL 3 JP4,675,218B

SUMMARY OF INVENTION

Technical Problem

However, there is currently a need for a novel production method and a production system of producing cleaning members capable of trapping dust, trash etc. in a more efficient manner. Considering the circumstance, the present invention is based on a result of intensive and extensive investigation.

Thus, it is an object of the present invention to provide a novel production method and a novel production system that are suitable for producing a cleaning member having an excellent cleaning performance and that are capable of efficient production.

Solution to Problem

In order to attain the objective, the present invention provides a method of continuously producing a cleaning member obtained from a multi-layer web comprising at least an opened fiber bundle and a belt-shaped nonwoven fabric, the method at least comprising the steps of:

preparing a guide member provided with a pair of width-adjusting members having a predetermined spacing, conveying the belt-shaped fiber bundle comprising an opened fiber bundle through the pair of width-adjusting members of the guide member so as to adjust the width of the belt-shaped fiber bundle to the spacing, stacking the width-adjusted belt-shaped fiber bundle on the belt-shaped nonwoven fabric to form a multi-layer web, and connecting the constituent members of the multi-layer web.

Effects of Invention

In accordance with the present invention, a novel production method and a novel production system that are suitable for producing a cleaning member having an excellent cleaning performance and that are capable of efficient production are provided.

Figure 1:
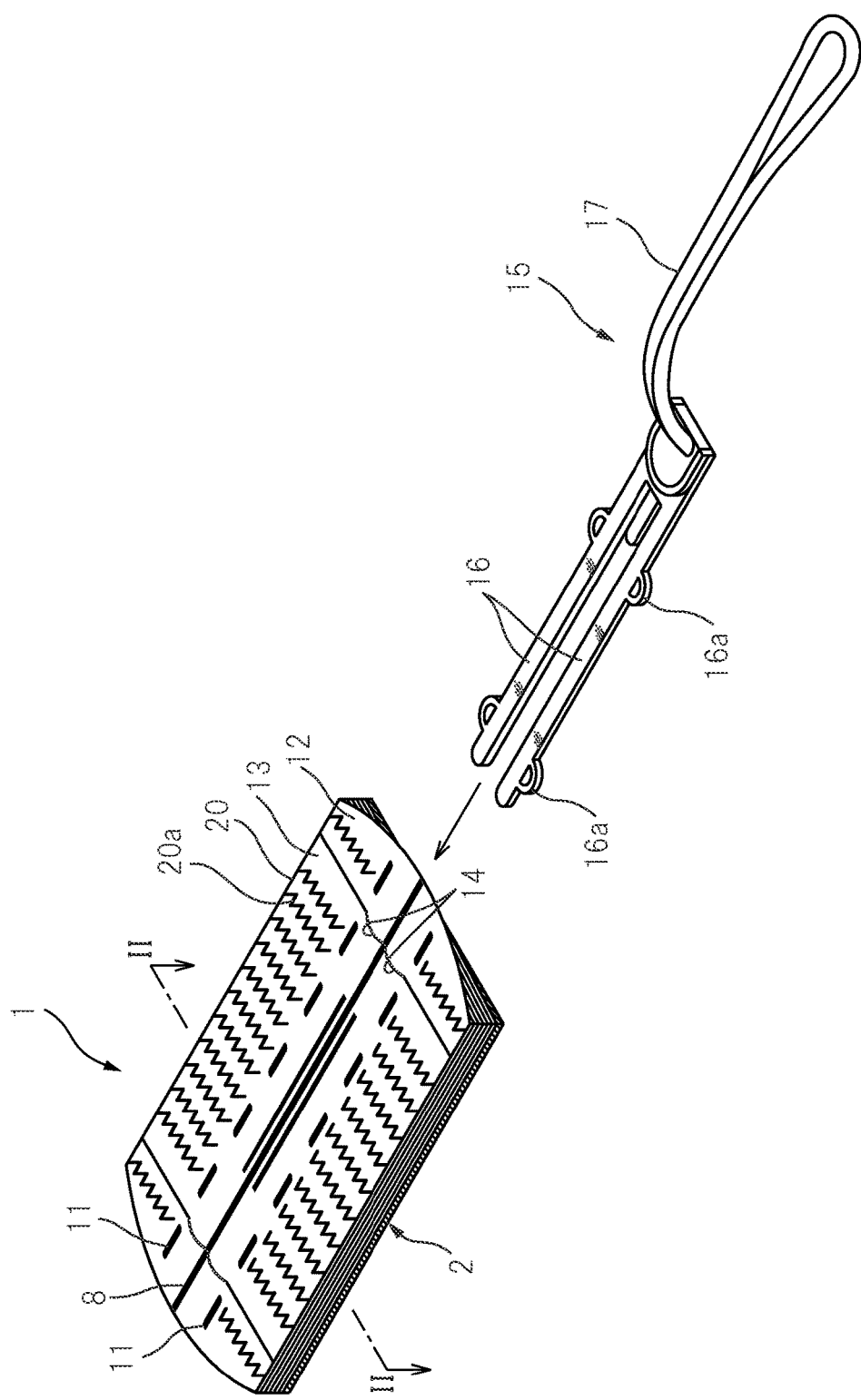
FIG. 1 is a perspective view of a cleaning member produced by an embodiment of the production method and/or production system of the present invention and a holding tool that is fixed to the cleaning member.

DESCRIPTION OF EMBODIMENTS (Method of Producing a Cleaning Member)

The method of producing the cleaning member of the present invention will now be explained in detail below.

The method of producing a cleaning member according to the present invention is a method of continuously producing a cleaning member obtained from a multi-layer web comprising at least an opened fiber bundle and a belt-shaped nonwoven fabric, the method at least comprising the steps of:

preparing a guide member provided with a pair of width-adjusting members having a predetermined spacing, conveying the belt-shaped fiber bundle comprising an opened fiber bundle through the pair of width-adjusting members of the guide member so as to adjust the width of the belt-shaped fiber bundle to the spacing, stacking the width-adjusted belt-shaped fiber bundle on the belt-shaped nonwoven fabric to form a multi-layer web, and connecting the constituent members of the multi-layer web. (aspect 1).

The method of producing a cleaning member according to the present invention is a novel production method that is suitable for producing a cleaning member having an excellent cleaning performance and that realizes efficient production. The method of producing a cleaning member according to the present invention comprises the steps of preparing a guide member provided with a pair of width-adjusting members having a predetermined spacing, and conveying the belt-shaped fiber bundle comprising an opened fiber bundle through the pair of width-adjusting members of the guide member so as to adjust the width of the belt-shaped fiber bundle to the spacing, thereby enabling easy control of the width of the belt-shaped fiber bundle.

In general, a belt-shaped fiber bundle comprising an opened fiber bundle tends to have a smaller basis weight of fibers at both end parts in the machine direction (i.e., both end parts in the lateral direction) during the process of fiber opening. However, by adjusting the width of the belt-shaped fiber bundle using the pair of width-adjusting members, there can be obtained an effect that the basis weight of the fiber may increase at both end parts in the machine direction and the basis weight of the belt-shaped fiber bundle may be equalized at the central part and the ends in the lateral direction.

In aspect 1, preferably the pair of width-adjusting members may have a rod shape and that the axial direction of the pair of width-adjusting members crosses the machine direction of the opened fiber bundle (aspect 2). This will lead to a smaller area of contact between the pair of width-adjusting members and the opened fiber bundle, thereby reducing the frequency that the opened fiber bundle breaks, twines around the width-adjusting members, etc.

Preferred angles to be formed in between the direction of the axis and the machine direction will be explained below.

As used herein the term "rod shape" comprises linear shapes and non-linear shapes such as curved ones.

Also, as used herein the term "cross" means that the two directions are not parallel and is a concept containing orthogonality. Also, as used herein the term "orthogonality" means that the two directions cross at right angles to each other.

According to an embodiment (e.g., aspect 2) of the present invention wherein the pair of width-adjusting members have a rod shape, preferably the axial direction of the pair of width-adjusting members is almost orthogonal to the lateral direction of the opened fiber bundle. By being almost orthogonal, the opened fiber bundle may not be easily broken when the opened fiber bundle is conveyed in a loose state.

According to one embodiment (e.g., aspect 2) of the embodiments of the present invention wherein the pair of width-adjusting members have a rod shape, the pair of width-adjusting members may preferably have a curved surface part in an area (contact area) in contact with the end surface of the belt-shaped fiber bundle, and the pair of width-adjusting members may have a circular or an ellipsoidal cross sectional shape.

According to another embodiment of the present invention wherein the pair of width-adjusting members have a rod shape, the pair of width-adjusting members have a curved surface part and non-curved surface part, in which the curved surface part has a cross sectional shape formed by circular or ellipsoidal arcs and chords and the non-curved surface part has a polygonal, e.g., triangular and rectangular, cross sectional shape.

According to aspect 1 or 2, preferably the upper end of the pair of the width-adjusting members is located at the upstream side to the lower end in the machine direction (aspect 3). Thereby, in adjusting the width of a belt-shaped fiber bundle, the belt-shaped fiber bundle receives a downward force, which renders the belt-shaped fiber bundle hardly floated up, with a result that the position of the belt-shaped fiber bundle is not easily displaced when it is stacked on a belt-shaped nonwoven fabric.

In cases where the upper end of the pair of the width-adjusting members are located at the downstream side to the lower end in the machine direction, the belt-shaped fiber bundle receives an upward force in adjusting the width of the belt-shaped fiber bundle, which renders the belt-shaped fiber bundle easily floated up, with a result that the position of the belt-shaped fiber bundle is easily displaced.

There are cases in which a belt-shaped fiber bundle may not be conveyed with a belt, etc., and may be conveyed in a loose state on conveying members such as rolls (e.g., rotating rolls and non-rotating rolls) that are placed at a fixed spacing. In such cases, in deciding the position of the upper and lower end (the upstream side or downstream side) of the pair of width-adjusting members, a "conveying surface" is estimated by assuming that the belt-shaped fiber bundle linearly moves on each conveying member, and, based on the conveying surface, the upper and lower end are determined to be at the upstream side or downstream side. In a state wherein the belt-shaped fiber bundle is in a loose state, the belt-shaped fiber bundle hardly floats up, and when the tensile force in the machine direction becomes transiently high, the belt-shaped fiber bundle easily floats up, and therefore the conveying surface is estimated.

When the belt-shaped fiber bundle is conveyed with a belt, etc., a surface that forms the belt-shaped fiber bundle becomes a "conveying surface."

In any one of aspects 1 through 3, it may be preferred that the pair of width-adjusting members have a curved surface part in an area in contact with the end surface of the belt-shaped fiber bundle (aspect 4). Thereby, the opened fiber bundle may not be easily broken when it comes into contact with the width-adjusting members.

The curved surface part may not be specifically limited as long as the opened fiber bundle is not easily broken, and includes, for example, part of a cylindrical surface such as part of a circular cylindrical surface and an elliptic cylindrical surface, and part of a conical surface such as part of a circular conical surface and an elliptoconical surface.

In any one of aspects 1 through 4, it may be preferred that the guide member further contains a supporting member that connects the lower ends of the pair of width-adjusting members, and conveys the belt-shaped fiber bundle on the supporting member (aspect 5). In any one of aspects 1 through 5, it may be preferred that the guide member further contains a height-adjusting member that connects the upper ends of the pair of width-adjusting members, and conveys the belt-shaped fiber bundle in a controlled manner so as not to exceed the height of the height-adjusting member (aspect 6).

Thereby, when, for example, a tensile strength applied on the belt-shaped fiber bundle in the machine direction varies with time, such as when the belt-shaped fiber bundle is conveyed in a manner different from the manner (continuous, intermittent, etc.) the belt-shaped nonwoven fabric is conveyed, it is easier to suppress the vertical movement of the belt-shaped fiber bundle and to stack the belt-shaped fiber bundle on top of the belt-shaped nonwoven fabric.

The supporting member and the height-adjusting member described may preferably have a shape similar to that of the pair of width-adjusting members.

Thus, according to the present invention, it may be preferred that the supporting member and the height-adjusting member described have a rod shape.

According to one embodiment wherein the supporting member and the height-adjusting member described have a rod shape, the supporting member and the height-adjusting member described may preferably have a curved surface part in an area (contact area) in contact with the end surface of the belt-shaped fiber bundle, and the supporting member and the height-adjusting member described may have a circular or an elliptic cross sectional shape.

As used herein, according to another embodiment wherein the supporting member and the height-adjusting member described have a rod shape, the supporting member and the height-adjusting member described contain a curved surface part and non-curved surface part, in which the curved surface part has a cross sectional shape formed by circular or ellipsoidal arcs and chords and the non-curved surface part has a polygonal, for example, triangular and rectangular, cross sectional shape.

In any one of aspects 1 through 6, it may be preferred that the opened fiber bundle is conveyed in a loose state (aspect 7). By so doing, the excessive opening of the fiber bundle that has been opened to the desired degree and the excessive expansion of the width of the opened fiber bundle, etc., can be suppressed.

In any one of aspects 1 through 7, it may be preferred that the opened fiber bundle is continuously conveyed at a constant speed, and the belt-shaped nonwoven fabric is conveyed in an intermittent manner so that the average speed thereof may coincides with the constant speed (aspect 8). By so doing, the opened fiber bundle can be conveyed while maintaining the loose state.

In any one of aspects 1 through 8, it may be preferred that the step of connecting the constituent members of the multi-layer web is a step of melt-bonding the constituent members (aspect 9).

In any one of aspects 1 through 9, it may be preferred to further comprise the step of cutting the multi-layer web into individual cleaning members (aspect 10).

(System of Producing a Cleaning Member)

The system of producing a cleaning member according to the present invention will now be explained in detail below.

The system of producing a cleaning member according to the present invention is a system of continuously producing a cleaning member that is obtained from a multi-layer web containing at least an opened fiber bundle and a belt-shaped nonwoven fabric, the system being equipped with, at least, a device provided with a guide member comprising a pair of width-adjusting members having a predetermined spacing, a device for forming a multi-layer web by stacking the width-adjusted belt-shaped fiber bundle on the belt-shaped nonwoven fabric, and a device for connecting the constituent members of the multi-layer web (aspect 11).

The system of producing a cleaning member according to the present invention can easily control the width of a belt-shaped fiber bundle. As described in aspect 1, the basis weight of the belt-shaped fiber bundle may be equalized at the central part and the end parts in the lateral direction.

In aspect 11, preferably the pair of width-adjusting members have a rod shape and that the axial direction of the pair of width-adjusting members crosses the machine direction of the opened fiber bundle (aspect 12). This will lead to a smaller area of contact between the pair of width-adjusting members and the opened fiber bundle, thereby reducing the frequency that the opened fiber bundle breaks, twines around the width-adjusting members, etc.

Preferred angles to be formed in between the axial direction and the machine direction will be explained below.

According to an embodiment (e.g., aspect 12) of the present invention wherein the pair of width-adjusting members have a rod shape, preferably the axial direction of the pair of width-adjusting members is almost orthogonal to the lateral direction of the opened fiber bundle. By being almost orthogonal, the opened fiber bundle cannot be easily broken when the opened fiber bundle is conveyed in a loose state.

In aspect 11 or 12, preferably the upper end of the pair of the width-adjusting members is located at the upstream side to the lower end in the machine direction (aspect 13). Thereby, in adjusting the width of a belt-shaped fiber bundle, the belt-shaped fiber bundle receives a downward force, and the belt-shaped fiber bundle does not easily float up, with a result that the belt-shaped fiber bundle can be easily stacked on a belt-shaped nonwoven fabric.

In any one of aspects 11 through 13, the pair of width-adjusting members may preferably have a curved surface part in an area in contact with the end surface of the belt-shaped fiber bundle (aspect 14). Thereby, the opened fiber bundle may not be easily broken when it comes into contact with the width-adjusting member.

In any one of aspects 11 through 14, preferably the guide member further contains a supporting member that connects the lower ends of the pair of width-adjusting members (aspect 15).

In any one of aspects 11 through 15, it may be preferred that the guide member further contains a height-adjusting member that connects the upper ends of the pair of width-adjusting members (aspect 16).

Thereby, when the belt-shaped fiber bundle is conveyed in a manner different from the manner the belt-shaped nonwoven fabric is conveyed, it may be easier to suppress the vertical movement of the belt-shaped fiber bundle, and to stack the belt-shaped fiber bundle on top of the belt-shaped nonwoven fabric.

In any one of aspects 11 through 16, it may be preferred to further comprise a device for cutting the multi-layer web into individual cleaning members (aspect 17).

Embodiments of the method and the system of producing a cleaning member according to the present invention are explained in more detail with reference to FIG. 1 through FIG. 7. The method and the system of producing a cleaning member according to the present invention are not limited to the embodiments of the present invention represented by FIG. 1 through FIG. 7 in a range without departing from the scope and spirit of the present invention.

First, a cleaning member 1 will be explained with reference to FIG. 1 through FIG. 3.

Figure 2:
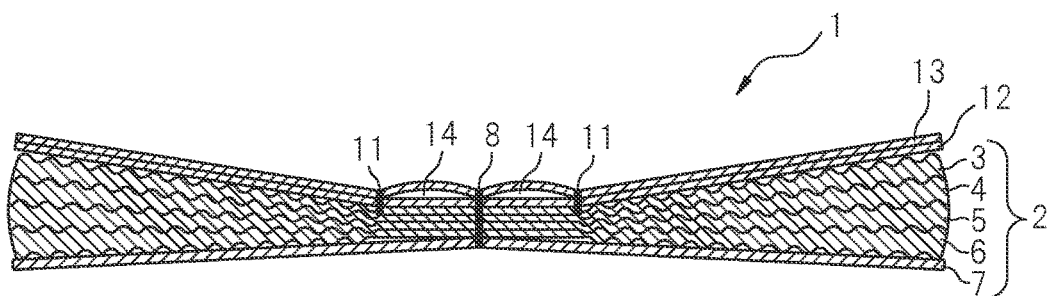
FIG. 2 is a sectional view of FIG. 1 along a II-II line.
Figure 3:
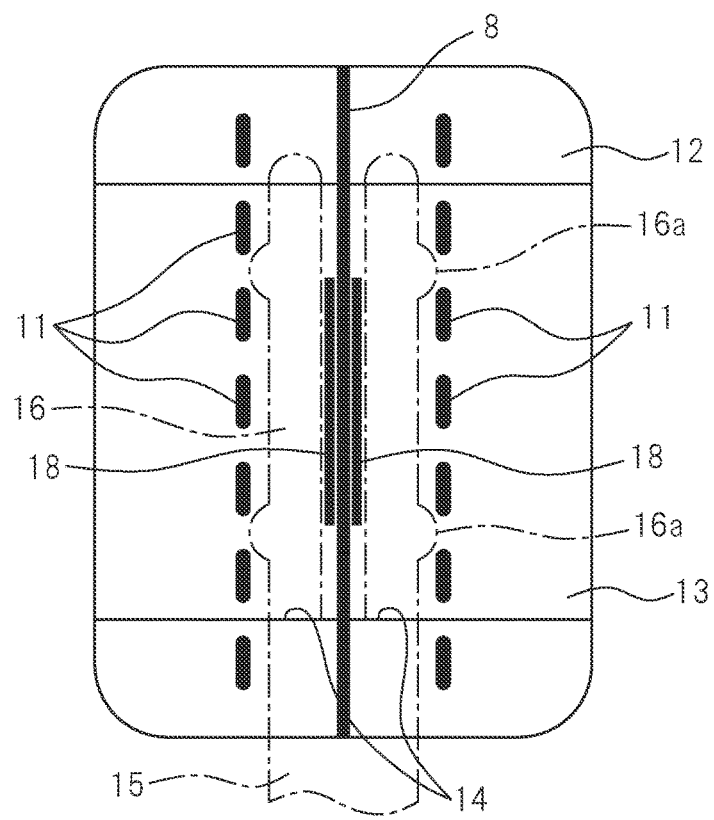
FIG. 3 is a plan view of the cleaning member shown in FIG. 1.

FIG. 1 is a perspective view of a holding tool that is fixed to the cleaning member 1, FIG. 2 is a sectional view of FIG. 1 along the II-II line, and FIG. 3 is a plan view of the cleaning member 1 shown in FIG. 1. In the explanation below, while "top" may be referred to as an upper side and "bottom" as a downside in FIG. 2, "top" and "bottom" in FIG. 2 are only used for the sake of explanation, and do not intend to limit the actual upper or lower direction of the cleaning member 1.

As shown in FIG. 1 through FIG. 3, the cleaning member 1 is equipped with a brush sheet 2, a base sheet 12 stacked on the upper side of the brush sheet 2, and a holding sheet 13 stacked on the upper side of the base sheet 12.

As shown in FIG. 1 through FIG. 3, in the cleaning member 1, a receiving part 14 into which the insertion part 16 of a holding tool 15 is to be inserted has been formed in between the base sheet 12 and the holding sheet 13. As shown in FIG. 1 through FIG. 3, in the cleaning member 1, two receiving parts 14 have been formed so as to receive the insertion part 16 that was divided into two. While the number of the receiving parts 14 in this embodiment is two, the number of the receiving parts can be changed as appropriate depending on the number of divisions of the insertion part 16. In another embodiment, there may be mentioned an embodiment in which the number of the insertion parts 14 is three or more.

As shown in FIG. 2, the brush sheet 2 has a fibrous member of a four-layer structure comprising a first fibrous member 3, a second fibrous member 4 stacked at the downside of the first fibrous member 3, a third fibrous member 5 stacked at the downside of the second fibrous member 4, and a fourth fibrous member 6 stacked at the downside of the third fibrous member 5, and a sheet with slits 7 stacked at the downside of the four-layer structured fibrous member (at the downside of the fourth fibrous member 6). The fibrous member of the brush sheet 2 according to the present embodiment has a four-layer structure, but the layer structure of the fibrous member can be changed as appropriate. In another embodiment, there may be mentioned an embodiment in which the fibrous member has a one-layer structure, a two-layer structure or a three-layer structure, and in still another embodiment, there may be mentioned an embodiment in which the fibrous member has a structure of five-layer or more. Also, while the brush sheet 2 in the present embodiment has a sheet with slits 7, the presence or absence of a sheet with slits 7 may be selected as appropriate. In another embodiment, there is a sheet with slits 7 that has been omitted.

The first through fourth fibrous members 3 through 6 are fiber bundles to which an oil solution is attached, and thus is a dust adhering agent (for example, an oil solution comprising liquid paraffin as an active ingredient) having an effect of promoting the adherence of dust, trash etc.

A fiber bundle is, for example, a tow, preferably an opened tow. As described in JIS L 0204-3:1998, 3.1.24, "tow" indicates a bundle of an extremely large number of filaments.

A fiber bundle may be a bundle of slit fibers (fibers made by cutting a film into reed-shaped parts and then stretching them), split fiber (fibers made by subdividing reed-shaped parts of film into a network structure) etc.

As fiber bundles, there can be mentioned, for example, fiber bundles consisting of or comprising thermoplastic fibers, etc. As raw materials constituting fiber bundles, there can be mentioned, for example, polyethylene, polypropylene, polyethylene terephthalate, nylon, rayon etc., and the type of fibers constituting fiber bundles include, for example, single fibers, composite fibers (for example, core-sheath type composite fibers, side-by-side composite fibers), etc. From the viewpoint of thermal bondability, composite fibers may preferably be core-sheath type composite fibers, and more preferably core-sheath type composite fibers in which the melting point of the core is higher than that of the sheath.

As a preferred core-in-sheath composite fiber, there can be mentioned core-sheath type composite fibers in which the core consists of polypropylene or polyethylene terephthalate and the sheath consists of polyethylene, and more preferably core-sheath type composite fibers in which the core consists of polyethylene terephthalate and the sheath consists of polyethylene.

The purity of a fiber constituting fiber bundles may preferably be 1-500 dtex, more preferably 2-10 dtex. Fiber bundles may comprise a plurality of fibers having the same purity, or a single fiber or a plurality of fibers having a different purity.

In the present embodiment, each fiber constituting fiber bundles is composed of curled fibers. By allowing each fiber to be composed of curled fibers, fiber bundles can be made bulky and can be made a structure that permits easy trapping of dust, etc. at the curled parts. In another embodiment, there can be mentioned an embodiment in which each fiber constituting fiber bundles is composed of noncurled fibers.

Similarly to the base sheet 12 and the holding sheet 13, as described below, the sheet with slits 7 is composed of a nonwoven fabric consisting of a thermoplastic fiber (a thermally fusion-bondable fiber) or a nonwoven fabric comprising a thermoplastic fiber, and is formed in a rectangular shape of the same width and the same length as those of the base sheet 12. In the sheet with slits 7, saw-edged slits (not shown) are made at a given distance along the entire sheet with slits 7, and with the slits, saw-edged reed-shaped parts (not shown) are formed over the entire length along both lateral ends of the sheet with slits 7.

As shown in FIG. 1 through FIG. 3, a base sheet 12 and a holding sheet 13 are stacked sequentially on the upper side of the first fibrous member 3 of the brush sheet 2, and a receiving part 14 into which the insertion part 16 of the holding tool 15 is to be inserted is formed in between the base sheet 12 and the holding sheet 13.

As shown in FIG. 3, the base sheet 12 and the holding sheet 13 have a rectangular form, and the lateral dimension (the direction of left to right in FIG. 3) of both sheets is set to be the same, and the longitudinal dimension (the vertical direction in FIG. 3) is set to be longer in the base sheet 12 so that both longitudinal ends of the base sheet 12 protrudes by a predetermined length from both longitudinal ends of the holding sheet 13, with the holding sheet 13 being stacked on the upper side of the base sheet 12.

The base sheet 12 and the holding sheet 13 are made of a nonwoven fabric consisting of a thermoplastic fiber (thermally fusion-bondable fiber) or a nonwoven fabric comprising a thermoplastic fiber. As thermoplastic fibers, there can be mentioned, for example, a polyethylene fiber, a polypropylene fiber, a polyethylene terephthalate fiber, a composite fiber of polyethylene and polyethylene terephthalate, and a composite fiber of polyethylene and polypropylene, such as core-sheath type composite fibers in which the core is composed of polyethylene terephthalate and the sheath is composed of polyethylene. As the type of nonwoven fabric, there is, for example, a thermal bond nonwoven fabric, a spunbonded nonwoven fabric, a spunlace nonwoven fabric and the like.

In another embodiment, the base sheet and the holding sheet are made of a thermoplastic resin film such as a polyethylene film and a polypropylene film, and in still another embodiment, there may be mentioned an embodiment in which the base sheet and the holding sheet are made of a laminate sheet comprising a nonwoven fabric and a resin film.

The base sheet 12 and the holding sheet 13 are integrally fusion-bonded to all the layers (the first fibrous member 3, the second fibrous member 4, the third fibrous member 5, the fourth fibrous member 6, and the sheet with slits 7) of the brush sheet 2 through a first melt bonded part forming device 158 described below, and in the cleaning member 1, a first melt-bonding part 8 longitudinally extending in the central part is formed as shown in FIG. 1 through FIG. 3.

Furthermore, at both ends (lateral ends in FIG. 2) of the first melt-bonding part 8, the base sheet 12 and the holding sheet 13 are integrally bonded to one layer (the first fibrous member 3) of the brush sheet 2 through a second melt bonded part forming device 134 described below, and in the cleaning member 1, two second melt-bonding parts 11 are longitudinally formed. Each of the two second melt-bonding parts 11 is intermittently formed. Since the first fibrous member 3 is fusion-bonded to the base sheet 12 and the holding sheet 13, the first fibrous member 3 follows the movement of these sheets 12 and 13, and thus the brush sheet 2 tends to further expand during use, resulting in an improved cleaning efficiency.

The base sheet 12 and the holding sheet 13 are fusion-bonded to all the layers (the first fibrous member 3, the second fibrous member 4, the third fibrous member 5, the fourth fibrous member 6, and the sheet with slits 7) of the brush sheet 2 in the first melt-bonding part 8, and are fusion-bonded to the first fibrous member 3 of the brush sheet 2 in two second melt-bonding parts 11. This results in the formation of a pair of receiving parts 14, which extends in the longitudinal direction of the base sheet 12 and the holding sheet 13 and which is a saclike space opening on both longitudinal ends, compartmentalized by the first melt-bonding part 8 and two second melt-bonding parts 11, thereby enabling the insertion part 16 of the holding tool 15 to be inserted into the receiving part 14.

The base sheet 12 and the holding sheet 13 are fusion-bonded to the first fibrous member 3 of the brush sheet 2 at the central part thereof through a second melt bonded part forming device 134 described below, and in the cleaning member 1, a pair of melt bonding lines 18 are formed at a predetermined distance in the lateral direction of the base sheet 12 and the holding sheet 13, as shown in FIG. 3, with a first melt-bonding part 8 being formed in between the pair of melt bonding lines 18. The pair of melt bonding lines 18 are a landmark for monitoring the position of the first melt-bonding part 8 during the production step, and by monitoring whether the first melt-bonding part 8 is disposed in between the pair of the thermal melt bonding lines 18 with a sensor etc., good items and defective items can be sorted out.

As shown in FIG. 1 through FIG. 3, two second melt-bonding parts 11 are intermittently provided at several places in the longitudinal direction of the base sheet 12 and the holding sheet 13, and by engaging an arc-like protrusion 16a at each insertion part 16 of the holding tool 15 with the non-fusion-bonded part of the two second melt-bonding parts 11, each insertion part 16 of the holding tool 15 is prevented from coming off each receiving part 14.

As shown in FIG. 1, saw-edged slits 20a are provided at each given distance along the longitudinal direction in both lateral ends (the external parts of two second melt-bonding parts 11) of the base sheet 12 and the holding sheet 13, and with the slits 20a, a plurality of reed-shaped parts 20, both ends of which are saw-edged, are provided. In another embodiment, there is no saw-edged slits 20a provided in the base sheet 12 and the holding sheet 13, and thus reed-shaped parts 20 are not provided.

As shown in FIG. 1, the holding tool 15 has a pair of rectangular plate-shaped insertion parts 16 disposed in parallel to each other, a pair of arc-like protrusions 16a protruding from the outer face of both longitudinal ends of each insertion part 16, and a holder part 17 provided integrally on one end of the insertion part 16, and is made, for example, of plastic etc.

By inserting both insertion parts 16 of the holding tool 15 into both insertion parts 14 of the cleaning member 1, and engaging the protrusions 16a with two second melt-bonding parts 11, the cleaning member 1 can be mounted to the holding tool 15. By holding the holder part 17 of the holding tool 15, and allowing the brush sheet 2 to come into contact with a target cleaning site to move it in the desired direction, dusts etc. at the target cleaning site are trapped by the brush sheet 2, resulting in the cleaning of the target cleaning site.

The cleaning member shown in FIG. 1 through FIG. 3 is an example of a cleaning member that can be produced by the method and system of producing a cleaning member according to the present invention. The method of producing a cleaning member and the system of producing a cleaning member according to the present invention can be used in producing cleaning members as described in, for example, Kokai (Japanese Unexamined Patent Publication) Nos. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460 and 2007-209461, 2007-029136, 2007-111297, 2007-135666, 2007-136156, 2007-159612, 2007-236690, 2008-006260, 2008-119171, and 2007-029135, the entire disclosures of which are incorporated herein by reference.

The method of producing a cleaning member and the system of producing a cleaning member according to the present invention can be used to produce cleaning members as described in, for example, U.S. Pat. No. 6,554,937B, US 2002/148061A, US 2003/0000934A, US 2004/0149095A, US 2005/0005381A, US 2005/039285A, US 2005/097695A, US 2005/097696A, US 2005/132521A, US 2005/177967A, US 2005/188490A, US 2005/193513A, US 2005/193514A, US 2005/198760A, US 2006/016035A, US 2006/016036A, US 2006/101601A, US 2009/165230A and US 2009/172904A, as well as US 2009/049633A, US 2009/255078A and US 2010/154156A, the entire disclosures of which are incorporated herein by reference.

Next, an embodiment of a method and a device for producing a cleaning member 1 will be explained with reference to FIG. 4.

Figure 4:
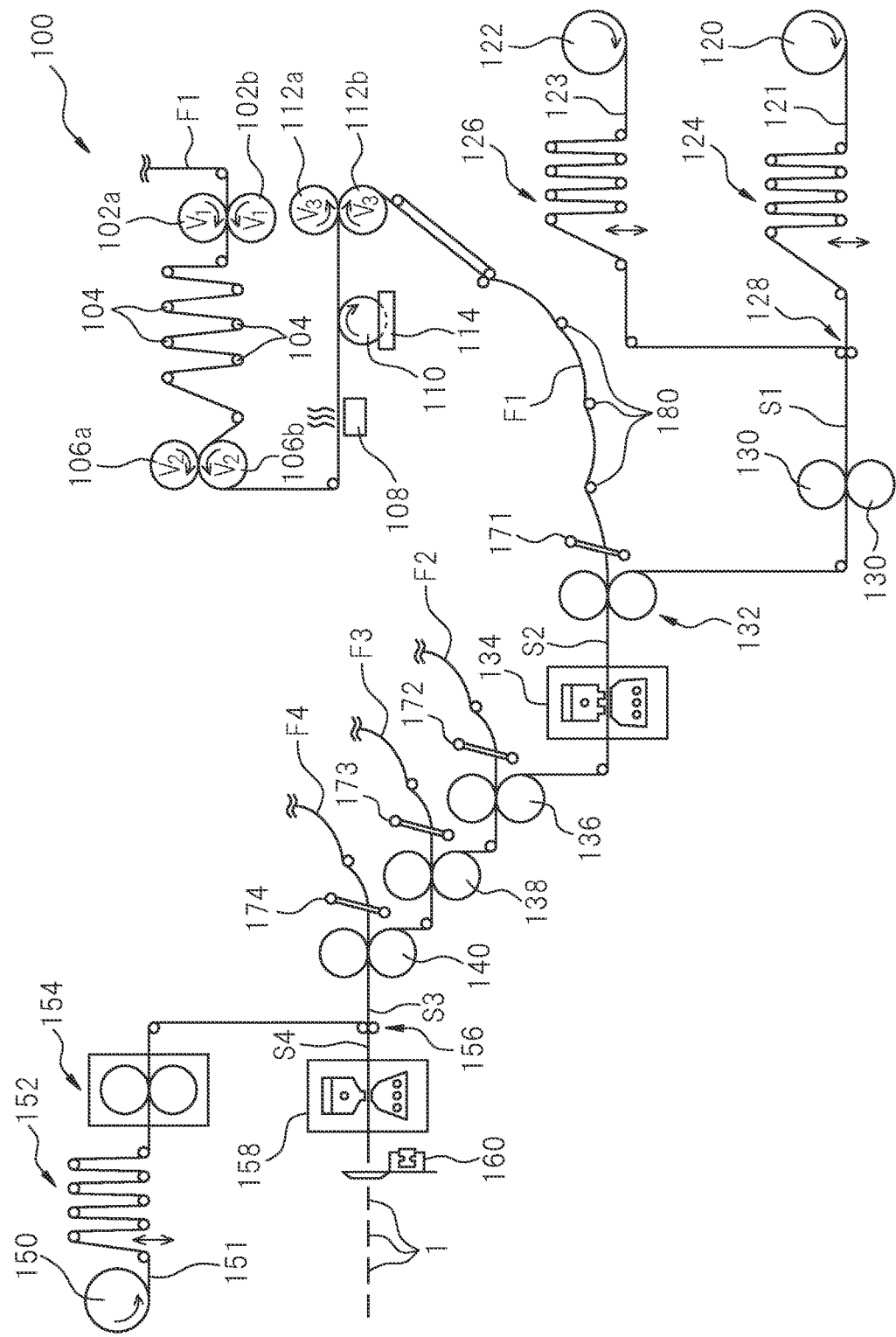
FIG. 4 is a schematic view for explaining a method and/or a system of producing the cleaning member shown in FIG. 1.

FIG. 4 is a schematic view for explaining a method and the device for producing a cleaning member 1, and in the present embodiment, the method of producing the cleaning member 1 is carried out using a device 100 shown in FIG. 4 to produce the cleaning member 1.

In the present embodiment, the method of producing the cleaning member 1 comprises the following step 1 and step 2.

[Step 1] A step of opening a fiber bundle—a step of conveying it.

[Step 2] A step of producing a multi-layer web using fiber bundles and excising (cutting out) the cleaning member 1 from the multi-layer web.

<Step 1>

Hereinbelow, step 1 will be explained.

In the present embodiment, step 1 comprises the following step 1a and step 1b.

[Step 1a] A step of opening a first fiber bundle F1 through a fourth fiber bundle F4.

[Step 1b] A step of conveying the first fiber bundle F1 through the fourth fiber bundle F4.

According to the present embodiment, while step 1 comprises step 1a, the presence or absence of step 1a can be selected as appropriate depending on the type etc. of the fiber bundle used. In another embodiment, there can be mentioned an embodiment in which step 1a is omitted. For example, when fiber bundles are composed of a noncurled fiber, step 1a can be omitted.

[Step 1a]

Hereinbelow, step 1a will be explained with reference to a step of opening the first fiber bundle F1 by way of example, and steps of opening other fiber bundles can be carried out in a similar manner.

The first fiber bundle F1 composed of a curled fiber is continuously extracted from a housing container (not shown), and conveyed to first nip rolls 102a and 102b revolving at a constant peripheral velocity $V_1$. The first fiber bundle F1 that passed through the first nip rolls 102a and 102b passes through a plurality of tension rolls 104, and is conveyed to second nip rolls 106a and 106b revolving at a peripheral velocity $V_2$.

The peripheral velocity $V_2$ of the second nip rolls 106a and 106b is faster than the peripheral velocity $V_1$ of the first nip rolls 102a and 102b. Due to the difference in the rim speed, tension is imparted to the first fiber bundle F1 between the first nip rolls 102a and 102b and the second nip rolls 106a and 106b, resulting in the opening of the first fiber bundle F1.

Each tension roll 104 is formed, for example, of a solid steel, and the weight has been adjusted to require a significant degree of force for revolving. Thus, during the movement of the first fiber bundle F1, while rotating each tension roll 104, from the first nip rolls 102a and 102b toward the second nip rolls 106a and 106b, the moving speed of the first fiber bundle F1 has been adjusted not to increase abruptly.

In order to obtain the gradual opening of the first fiber bundle F1, each tension roll 104 has been disposed so as to lengthen the distance between the first nip rolls 102a and 102b and the second nip rolls 106a and 106b.

The first fiber bundle F1 that passed through the second nip rolls 106a and 106b passes through an air supplier 108, and is conveyed to third nip rolls 112a and 112b revolving at a peripheral velocity $V_3$. The peripheral velocity $V_3$ of the third nip rolls 112a and 112b is slower than the peripheral velocity $V_2$ of the second nip rolls 106a and 106b. Due to the difference in the rim speed, tension of the first fiber bundle F1 is relieved between the second nip rolls 106a and 106b and the third nip rolls 112a and 112b, resulting in the opening of the first fiber bundle F1 as well as the widening of the width of the first fiber bundle F1.

On the first fiber bundle F1 that is conveyed from the second nip rolls 106a and 106b to the third nip rolls 112a and 112b, air is blown from the air supplier 108, resulting in the further opening of the first fiber bundle F1.

According to the present embodiment, while the first fiber bundle F1 is opened using the application and release of tension and air blowing, the method of opening can be changed as appropriate. In another embodiment, there can be mentioned an embodiment in which either of the application and release of tension or air blowing is used, and in still another embodiment, there can be mentioned an embodiment in which another method of opening is used in addition to the application and release of tension and air blowing. Also in the present embodiment, while the first through third nip rolls are used in the application and release of tension, the number of nip rolls can be changed as appropriate. In another embodiment, additional nip rolls are used for the application and tension is released in addition to the first through third nip rolls.

An oil solution is contained in an oil solution tank 114. In the present embodiment, the oil solution contained in the oil solution tank 114 is a dust-adhering oil solution (such as an oil solution comprising liquid paraffin as an active ingredient) having an effect of promoting the adsorption of dust, etc.

[Step 1b]

Hereinbelow, step 1b will be explained with reference to a step of conveying the first fiber bundle F1 by way of example, and steps of conveying other fiber bundles can be carried out in a similar manner.

After passing through the third nip rolls 112a and 112b, the first fiber bundle F1 passes through first guide member 171 before reaching a stacking roll 132. Similarly, the second fiber bundle F2, after passing through the third nip rolls 112a and 112b, passes through second guide member 172, and the third fiber bundle F3, after passing through the third nip rolls 112a and 112b, passes through third guide member 173, and the fourth fiber bundle F4, after passing through the third nip rolls 112a and 112b, passes through fourth guide member 174.

Then, the first fiber bundle F1 proceeds to a stacking roll 132. Similarly, after step 1b, the second through fourth fiber bundles F2 through F4 proceed to stacking rolls 136, 138 and 140.

<Step 2>

Hereinbelow, step 2 will be explained.

In the present embodiment, step 2 comprises the following step 2a through step 2c.

[Step 2a] A step of stacking a fiber bundle that underwent through step 1b and another member (a belt-shaped nonwoven fabric in the present embodiment) to form a multi-layer web.

[Step 2b] A step of fixing the fiber bundle and another member contained in the multi-layer web.

[Step 2c] A step of excising individual cleaning members 1 from the multi-layer web.

[Step 2a]

Hereinbelow, step 2a will be explained.

In the present embodiment, the other members that are stacked with the fiber bundles that underwent the step 1b are belt-shaped nonwoven fabrics 121, 123 and 151. In another embodiment, one or two of these belt-shaped nonwoven fabrics are stacked with the fiber bundles that underwent the step 1b, and in still another embodiment, another belt-shaped nonwoven fabric, in addition to these belt-shaped nonwoven fabrics, is stacked with the fiber bundles that underwent the step 1b. In any of the embodiments, the order of stacking is not limited, but preferably stacking may be carried out so that the belt-shaped nonwoven fabric is positioned at the outermost layer.

The belt-shaped nonwoven fabrics 121 and 123 correspond to the base sheet 12 and the holding sheet 13, respectively, of the cleaning member 1. The belt-shaped nonwoven fabric 121 is continuously curled out from an nonwoven fabric roll 120, and is conveyed intermittently by passing through a dancer roll 124 comprising a plurality of rolls provided in two vertical stages wherein a roll located at the lower stage fluctuates vertically. Similarly, the belt-shaped nonwoven fabric 123 is continuously curled out from an nonwoven fabric roll 122, and is conveyed intermittently by passing through a dancer roll 126 comprising a plurality of rolls provided in two vertical stages wherein a roll located at the lower stage fluctuates vertically. As used herein "is conveyed intermittently" means that the belt-shaped nonwoven fabrics 121 and 123 are conveyed by repeating the steps of proceeding by a given distance (for example, roughly the lateral length of the cleaning member 1) and then stopping conveying for a certain period of time. Thus, by the intermittent conveyance of the belt-shaped nonwoven fabrics 121 and 123, the time required to fusion-bond the constituent members of the multi-layer web described below can be secured.

The belt-shaped nonwoven fabrics 121 and 123 are stacked at a stacking roll 128 to form a multi-layer web S1, and the multi-layer web S1 passes through a gather cutter 130 in which saw-edged blades (not shown) are intermittently formed on the surface thereof in a circumferential direction. This results in the formation of slits corresponding to slits 20a (see FIG. 1) in the base sheet 12 and the holding sheet 13. And the multi-layer web S1 proceeds to a stacking roll 132.

At the stacking roll 132, the multi-layer web S1 is stacked on the first fiber bundle F1 that underwent the step 1 to form a multi-layer web S2. The first fiber bundle F1 is configured to become loosened slightly in between the third nip rolls 112a and 112b and the stacking roll 132, and thus fulfills the same function as a dancer roll provided between them would do.

At stacking rolls 136, 138 and 140, the multi-layer web S2 is stacked sequentially with the second fiber bundle F2 through the fourth fiber bundle F4 that underwent the step 1 to form a multi-layer web S3.

A belt-shaped nonwoven fabric 151 corresponds to the sheet with slits 7 of the cleaning member 1. The belt-shaped nonwoven fabric 151 is continuously curled out from the nonwoven fabric roll 150, and is intermittently conveyed by passing through a dancer roll 152, and then passes through a gather roll 154. The gather roll 154 has saw-edged blades (not shown) continuously formed on the surface of the roll in a circumferential direction, which results in the formation of saw-edged slits (not shown) on the belt-shaped nonwoven fabric 151 that passed through the gather roll 154.

The belt-shaped nonwoven fabric 151 is stacked on the multi-layer web S3 at a stacking roll 156 to form a multi-layer web S4.

[Step 2b]

Hereinbelow, step 2b will be explained.

Before merging with the second fiber bundle F2 through the fourth fiber bundle F4, the multi-layer web S2 passes through a second melt bonded part forming device 134. The second melt bonded part forming device 134 fusion-bonds belt-shaped nonwoven fabrics 121 and 123 contained in the multi-layer web S2 to the first fiber bundle F1 to form two second melt-bonding parts 11 (see FIG. 3). This results in the melt-bonding of the multi-layer web S2 in the direction of the thickness thereof. In the present embodiment, while a heat sealing device is used as the second melt bonded part forming device 134, another heat sealing device (such as an ultrasonic sealing device) may be used.

The multi-layer web S4 passes through a first melt bonded part forming device 158. The first melt bonded part forming device 158 fusion-bonds the entire hole multi-layer web S4 to form a first melt-bonding part 8 (see FIG. 3) on the multi-layer web S4. This results in the melt-bonding of the multi-layer web S4 in the direction of the thickness thereof.

In the present embodiment, while a heat sealing device is used as the first melt bonded part forming device 154, the heat sealing device can be changed as appropriate. In another embodiment, an ultrasonic sealing device is used.

[Step 2c]

Hereinbelow, step 2c will be explained.

The multi-layer web S4 that passed through the first melt bonded part forming device 158 is cut by a cutting device 160, so that individual cleaning members 1 are excised.

The cleaning member 1 produced according to the present embodiment contains the sheet with slits 7, whereas a cleaning member produced by another embodiment does not contain the sheet with slits 7. In the cleaning member 1 produced by the present embodiment, the receiving part 14 is disposed on the face of the cleaning member 1, whereas in a cleaning member produced by another embodiment, the receiving part 14 is disposed in between any of adjacent fibrous members 3 through 6 by changing the order of stacking the base sheet 12 and the holding sheet 13 and the fibrous members 3 through 6. This makes it possible to use both faces of the cleaning member 1 in cleaning. At this time, in order to facilitate the insertion of the insertion part 16 into the receiving part 14, the longitudinal dimension (vertical dimension in FIG. 3) of the base sheet 12 and the holding sheet 13 may preferably be made longer than that of the fibrous members 3 through 6, and these dimensions can be arbitrarily determined. Also, at this time, the sheet with slits 7 may or may not be used, and the sheet with slits 7 may be disposed on both faces of the cleaning member 1.

Figure 5:
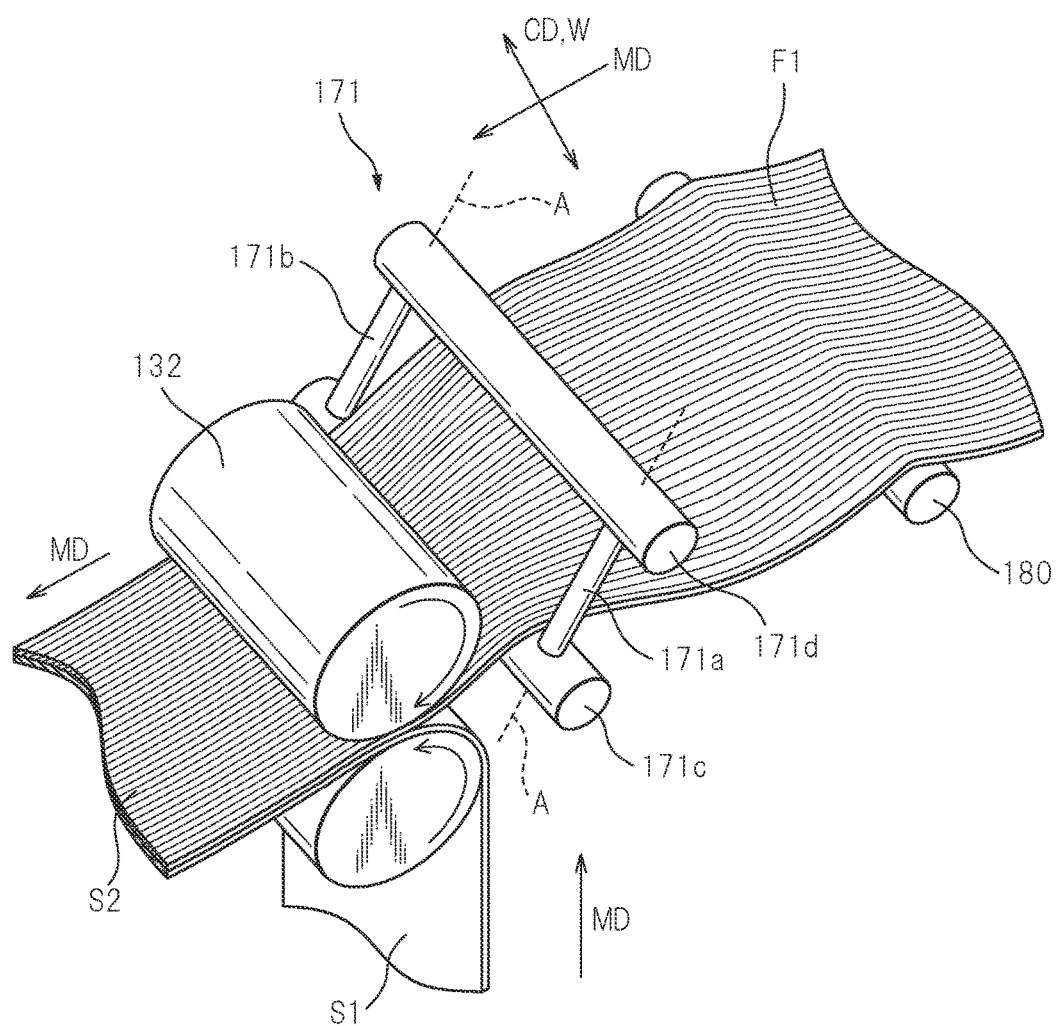
FIG. 5 is an enlarged perspective view of a vicinity of the first guide member 171 shown in FIG. 4.

FIG. 5 is an enlarged perspective view of a vicinity of the first guide member 171 shown in FIG. 4. In FIG. 5, the first guide member 171 consists of a pair of width-adjusting members 171a and 171b, a supporting member that connects the lower ends of the pair of width-adjusting members 171a and 171b, and a height-adjusting member 171d that connects the upper ends of the pair of width-adjusting members 171a and 171b. The pair of width-adjusting members 171a and 171b have a rod shape, and the direction of the axis A of the pair of width-adjusting members 171a and 171b crosses the machine direction of the first fiber bundle F1, and the direction of the axis A of the pair of width-adjusting members 171a and 171b is almost orthogonal to the lateral direction W (=the cross direction CD that is orthogonal to the machine direction MD) of the first fiber bundle F1.

In FIG. 5, the first fiber bundle F1 that passed through a third nip roll (not shown) is conveyed in a loose state to the machine direction, MD, while being supported by a non-rotating roll 180 and a supporting member 171c, and by passing between the pair of width-adjusting members 171a and 171b, the width of the first fiber bundle F1 is adjusted to the spacing of the pair of width-adjusting members 171a and 171b.

Subsequently, the first fiber bundle F1 of which width has been adjusted is stacked on the multi-layer web S1 at a stacking roll 132 to form a multi-layer web S2.

In FIG. 5, the pair of width-adjusting members 171a and 171b have a circular cross-sectional shape.

Figure 6:
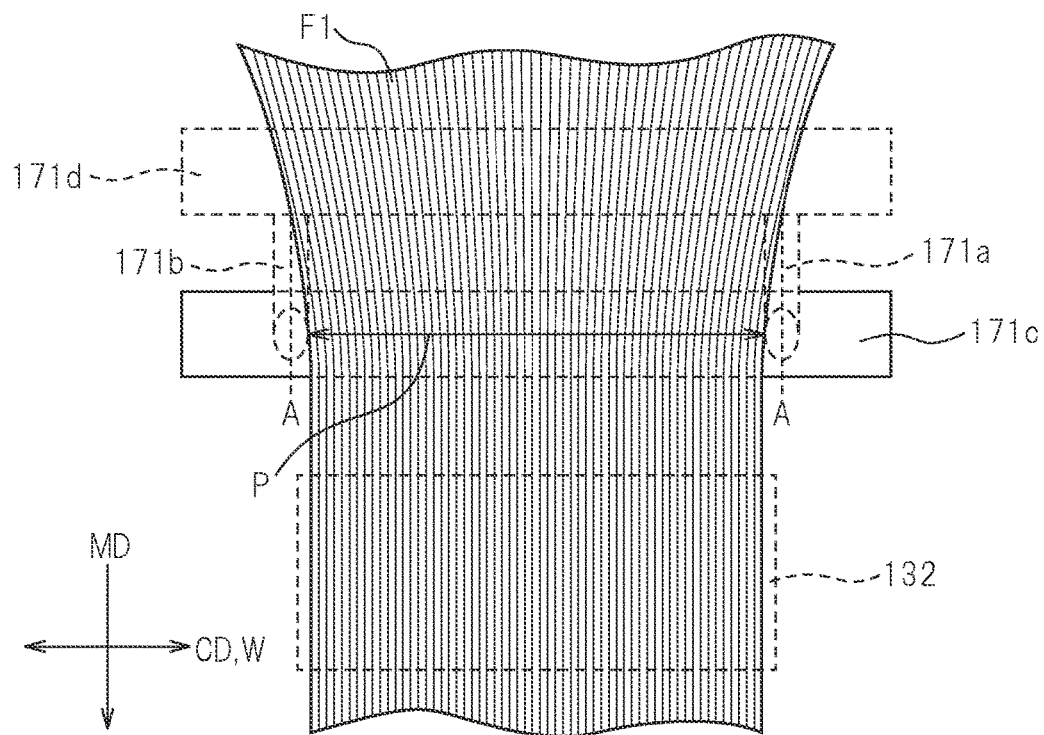
FIG. 6 is an overhead view of a vicinity (part of FIG. 5) of the first guide member 171 shown in FIG. 4.

FIG. 6 is an overhead view of a vicinity (part of FIG. 5) of the first guide member 171 shown in FIG. 4. For the sake of explanation, the pair of width-adjusting members 171a and 171b, the height-adjusting member 171d, and the stacking roll 132 are shown in dotted lines. In FIG. 6, the pair of width-adjusting members 171a and 171b have a curved surface part, more specifically part of a cylindrical surface, in an area in contact with the end surface of the first fiber bundle F1. Also, the width of the first fiber bundle F1 is adjusted to coincide with the predetermined spacing P of the pair of width-adjusting members 171a and 171b.

In FIG. 6, the direction of the axis A of the pair of width-adjusting members 171a and 171b is orthogonal to the lateral direction W of the first fiber bundle F1.

Figure 7:
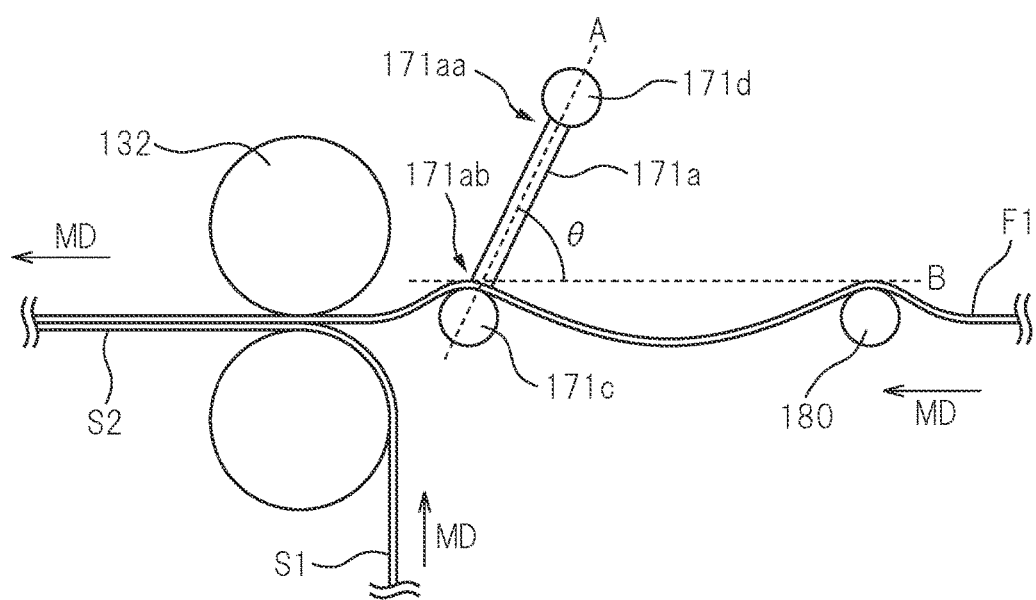
FIG. 7 is an enlarged view of a vicinity (FIG. 5) of the first guide member 171 shown in FIG. 4.

FIG. 7 is an enlarged view of a vicinity (FIG. 5) of the first guide member 171 shown in FIG. 4. In FIG. 7, the upper end 171aa of the width-adjusting member 171a is located at the upstream side to the lower end 171ab in the machine direction MD. The same holds true for the width-adjusting member 171b.

In the method of producing a cleaning member and in the system of producing a cleaning member of the present invention, it may be preferred that the upper end of the pair of width-adjusting members is located at the upstream side to the lower end in the machine direction, and that the upper end of the pair of width-adjusting members is located at the upstream side to the lower end in the machine direction so that the axis of the pair of width-adjusting members may preferably form an angle of greater than 0° and not greater than 90°, further preferably 10-80°, still more preferably 20-70°, and still further preferably 30-60° with the conveying surface of the belt-shaped fiber bundle.

The definition of "conveying surface" is as described above.

By satisfying the positional relationship, the belt-shaped fiber bundle hardly floats up as it passes through the guide member, the belt-shaped nonwoven fabric hardly floats up as it is stacked on the belt-shaped nonwoven fabric, and the position of the belt-shaped nonwoven fabric is hardly displaced.

The angle will be described with reference to FIG. 7.

In FIG. 7, the angle is represented by θ. θ is an angle that is formed by the axis A and the conveying surface B at the upstream side in the machine direction.

In FIG. 7, the axis A is an axis of the pair of width-adjusting members 171a and 171b. Also, in FIG. 7, the conveyance surface B is a surface formed by the first fiber bundle F1 when the first fiber bundle F1 that is conveyed in a loose state is assumed to move linearly on the non-rotating roll 180 and the supporting member 171c.

The present application claims the benefit of the following patent applications, the entire disclosures of which are incorporated herein by reference:

(1) JP Patent Application No. 2012-289181 filed on Dec. 29, 2012, and US patent application claiming priority thereof, i.e., U.S. Ser. No. 13/749,721, (2) JP Patent Application No. 2012-289182 filed on Dec. 29, 2012, and US patent application claiming priority thereof, i.e., U.S. Ser. No. 13/749,719, (3) JP Patent Application No. 2012-289174 filed on Dec. 29, 2012, and US patent application claiming priority thereof, i.e., U.S. Ser. No. 13/749,716, (4) JP Patent Application No. 2012-289189 filed on Dec. 29, 2012, and US patent application claiming priority thereof, i.e., U.S. Ser. No. 13/749,724, (5) JP Patent Application No. 2012-289175 filed on Dec. 29, 2012, and US patent application claiming priority thereof, i.e., U.S. Ser. No. 13/749,723, (6) JP Patent Application No. 2012-289188 filed on Dec. 29, 2012, and US patent application claiming priority thereof, i.e., U.S. Ser. No. 13/749,722, (7) JP Patent Application No. 2012-289179 filed on Dec. 29, 2012, and US patent application claiming priority thereof, i.e., U.S. Ser. No. 13/749,726, (8) JP Patent Application No. 2012-289177 filed on Dec. 29, 2012, and US patent application claiming priority thereof, i.e., U.S. Ser. No. 13/749,718, (9) JP Patent Application No. 2012-289184 filed on Dec. 29, 2012, and US patent application claiming priority thereof, i.e., U.S. Ser. No. 13/749,725,

(10) JP Patent Application No. 2012-289178 filed on Dec. 29, 2012, and US patent application claiming priority thereof, i.e., U.S. Ser. No. 13/749,714,

(11) JP Patent Application No. 2012-289176 filed on Dec. 29, 2012, and US patent application claiming priority thereof, i.e., U.S. Ser. No. 13/749,713,

(12) JP Patent Application No. 2013-002855 filed on Jan. 10, 2013, and US patent application claiming priority thereof, i.e., U.S. Ser. No. 13/749,717, as well as

(13) JP Patent Application No. 2013-002857 filed on Jan. 10, 2013, and US patent application claiming priority thereof, i.e., U.S. Ser. No. 13/749,715.

REFERENCE SIGNS LIST

1: cleaning member 2: brush sheet (shaggy brush sheet) 3: first fibrous member 4: second fibrous member 5: third fibrous member 6: fourth fibrous member 7: sheet with slits 8: first melt-bonding part 11: second melt-bonding part 12: base sheet 13: holding sheet 14: receiving part 15: holding tool 16: insertion part 16a: protrusion 17: holder part 18: melt bonding line 20: reed-shaped part 20a: slit 100: cleaning member producing device 102a, b: first nip rolls 104: tension roll 106a, b: second nip rolls 108: air supplier 110: transcription roll 112a, b: third nip rolls 113: blade member 114: oil solution tank 120, 122, 150: nonwoven fabric rolls 121, 123, 151: belt-shaped nonwoven fabrics 124, 126, 152: dancer rolls 128, 132, 136, 138, 140, 156: stacking rolls 130: gather cutter 134: second melt bonded part forming device 154: gather roll 158: first melt bonded part forming device 160: cutting device 171: first guide member 172: second guide member 173: third guide member 174: fourth guide member 180: non-rotating roll.

The invention claimed is:

1. A method of continuously producing a cleaning member from a multi-layer web comprising at least a belt-shaped fiber bundle and a belt-shaped nonwoven fabric, the belt-shaped fiber bundle comprising an opened fiber bundle, the method comprising:
  preparing a guide member provided with a pair of width-adjusting members having a predetermined spacing therebetween, each width-adjusting member of the pair of width-adjusting members having an upper end, a lower end, and a contact area,
  conveying the belt-shaped fiber bundle, in a machine direction, through the pair of width-adjusting members of the guide member while sides of the belt-shaped fiber bundle are in contact with the contact areas of the pair of width-adjusting members so as to reduce a width of the belt-shaped fiber bundle to coincide with the predetermined spacing between the pair of width-adjusting members,
  stacking the width-adjusted belt-shaped fiber bundle on the belt-shaped nonwoven fabric to form the multi-layer web, and
  connecting the stacked belt-shaped fiber bundle and belt-shaped nonwoven fabric of the multi-layer web,
wherein
  in each width-adjusting member of the pair of the width-adjusting members, the upper end is located upstream of the lower end in the machine direction,
  each width-adjusting member of the pair of width-adjusting members has a rod shape elongated in an axial direction crossing the machine direction,
  the guide member further includes a supporting member connecting the lower ends of the pair of width-adjusting members, and
  in said conveying, the belt-shaped fiber bundle is conveyed on the supporting member.

2. The method according to claim 1, wherein
  the pair of width-adjusting members has curved surface parts in the contact areas in contact with the sides of the belt-shaped fiber bundle.

3. The method according to claim 1, wherein the guide member further includes a height-adjusting member that connects the upper ends of the pair of width-adjusting members.

4. The method according to claim 1, further comprising conveying the opened fiber bundle in a loose state.

5. The method according to claim 4, wherein
  in said conveying the opened fiber bundle, the opened fiber bundle is conveyed continuously at a constant speed, and
  the belt-shaped nonwoven fabric is conveyed in an intermittent manner and an average speed of conveyance of the belt-shaped nonwoven fabric approximately coincides with the constant speed at which the opened fiber bundle is continuously conveyed.

6. The method according to claim 4, wherein, in said conveying the opened fiber bundle, the opened fiber bundle is conveyed in a relaxed or sagged state.

7. The method according to claim 1, wherein in said connecting the stacked belt-shaped fiber bundle and belt-shaped nonwoven fabric, the stacked belt-shaped fiber bundle and belt-shaped nonwoven fabric are melt-bonded together.

8. The method according to claim 1, further comprising cutting the multi-layer web into individual cleaning members.

* * * * *